(12) United States Patent
Zhu et al.

(10) Patent No.: US 11,456,696 B2
(45) Date of Patent: Sep. 27, 2022

(54) PHOTOVOLTAIC-MODULE CLEANING ROBOT AND OBSTACLE-SURMOUNTING CONTROL METHOD AND DEVICE THEREOF

(71) Applicant: SUNPURE TECHNOLOGY CO., LTD., Hefei (CN)

(72) Inventors: Lichun Zhu, Hefei (CN); Jiapeng Zhu, Hefei (CN); Wei Li, Hefei (CN); Zhisheng Jin, Hefei (CN); Yaobang Wang, Hefei (CN)

(73) Assignee: Sunpure Technology Co., Ltd.

( * ) Notice: Subject to any disclaimer, the term of this patent is extended or adjusted under 35 U.S.C. 154(b) by 438 days.

(21) Appl. No.: 16/748,069

(22) Filed: Jan. 21, 2020

(65) Prior Publication Data

US 2020/0235697 A1 Jul. 23, 2020

(30) Foreign Application Priority Data

Jan. 23, 2019 (CN) .......................... 201910062807.0

(51) Int. Cl.
*H02S 40/10* (2014.01)
*A47L 11/40* (2006.01)
*G05D 1/02* (2020.01)

(52) U.S. Cl.
CPC .......... *H02S 40/10* (2014.12); *A47L 11/4061* (2013.01); *G05D 1/0255* (2013.01);
(Continued)

(58) Field of Classification Search
CPC .. H02S 40/10; A47L 11/4061; A47L 2201/04; A47L 2201/00; A47L 11/4011;
(Continued)

(56) References Cited

U.S. PATENT DOCUMENTS 8,275,506 B1 * 9/2012 Bishel ................... G01S 13/87
701/25
9,931,009 B2 4/2018 Miyake et al.
(Continued)

FOREIGN PATENT DOCUMENTS

CN 106953589 A 7/2017
CN 107092260 A 8/2017
(Continued)

OTHER PUBLICATIONS

First Office Action dated Mar. 4, 2020, for Chinese Application No. 201910062807.0 and English translation.
(Continued)

*Primary Examiner* — Bhavesh V Amin
(74) *Attorney, Agent, or Firm* — Conley Rose, P.C.

(57) ABSTRACT

A photovoltaic-module cleaning robot, an obstacle-surmounting method and device thereof are provided according to the present application. If the photovoltaic-module cleaning robot gets stuck during obstacle-surmounting, a lower end motor of the photovoltaic-module cleaning robot is controlled to operate reversely, so that the lower driving wheels thereof rotate reversely; an upper end motor of thereof is controlled to stop operating, so that the upper driving wheels thereof have no drive; and then, the photovoltaic-module cleaning robot is gradually restored to a horizontal state, and if it is determined that the photovoltaic-module cleaning robot meets a forward moving condition, the upper end motor and the lower end motor of the photovoltaic-module cleaning robot are controlled to simultaneously rotate forward to realize moving forward, thereby solving the problem of easily getting stuck at a drop height between adjacent modules.

18 Claims, 6 Drawing Sheets

(52) U.S. Cl.
CPC ........ *G05D 1/0257* (2013.01); *A47L 2201/04* (2013.01); *G05D 2201/0215* (2013.01)

(58) Field of Classification Search
CPC .. A47L 11/4041; A47L 11/24; A47L 11/4066; A47L 9/009; A47L 9/2826; A47L 11/28; A47L 11/282; A47L 11/4002; A47L 11/4072; A47L 2201/022; A47L 2201/06; A47L 9/2857; A47L 11/4044; A47L 11/4083; A47L 2201/024; A47L 9/0477; A47L 9/28; A47L 9/2852; A47L 9/2873; A47L 11/02; A47L 11/302; A47L 11/40; A47L 11/4005; A47L 11/4013; A47L 11/4016; A47L 11/4027; A47L 11/4063; A47L 11/4069; A47L 11/408; A47L 11/4088; A47L 2201/02; A47L 2201/028; A47L 5/14; A47L 7/0028; A47L 7/0038; A47L 7/0042; A47L 9/0472; A47L 9/0686; A47L 9/10; A47L 9/1409; A47L 9/2805; A47L 9/2847; A47L 9/2884; A47L 9/2894; A47L 9/30; G05D 1/0255; G05D 1/0257; G05D 2201/0215; G05D 2201/0203; G05D 1/0214; G05D 1/0044; G05D 1/02; G05D 1/0219; G05D 1/0227; G05D 1/0248; G05D 1/0016; G05D 1/0246; G05D 1/027; G05D 1/0272; G05D 1/0274; G05D 1/0022; G05D 1/0212; G05D 1/0225; G05D 1/0231; G05D 1/024; G05D 2201/0208; Y02E 10/50; G06F 9/5016; G06F 9/5038; A46B 13/001; A46B 13/02; A46B 2200/302; A46B 9/026

See application file for complete search history.

(56) References Cited

U.S. PATENT DOCUMENTS

| | | | | |
|---|---|---|---|---|
| 10,788,836 | B2* | 9/2020 | Ebrahimi Afrouzi | ........................ G05D 1/0246 |
| 11,045,060 | B2* | 6/2021 | Xie | ........................ G05D 1/0088 |
| 11,076,737 | B2* | 8/2021 | He | ........................ A46B 9/026 |
| 11,153,503 | B1* | 10/2021 | Ebrahimi Afrouzi | .. G06V 10/25 |
| 11,199,853 | B1* | 12/2021 | Afrouzi | ................ G05D 1/0246 |
| 2007/0016328 | A1* | 1/2007 | Ziegler | ................ G05D 1/0219 701/23 |
| 2007/0273864 | A1* | 11/2007 | Cho | ........................ A47L 9/009 356/28 |
| 2008/0065265 | A1* | 3/2008 | Ozick | .................... A47L 9/009 901/1 |
| 2008/0093131 | A1* | 4/2008 | Couture | .................. B25J 5/005 180/9.1 |
| 2008/0223630 | A1* | 9/2008 | Couture | ............. B62D 25/2054 901/1 |
| 2011/0266076 | A1* | 11/2011 | Morey | .................... B62D 55/06 901/1 |
| 2012/0167917 | A1* | 7/2012 | Gilbert, Jr. | ............ A47L 11/408 134/6 |
| 2013/0054022 | A1* | 2/2013 | Jang | ...................... A47L 9/2805 700/245 |
| 2013/0054026 | A1* | 2/2013 | Jang | ..................... G05D 1/0227 700/258 |
| 2015/0197012 | A1* | 7/2015 | Schnittman | ............ G05D 1/027 700/250 |
| 2015/0265125 | A1 | 9/2015 | Lee et al. | |
| 2016/0000282 | A1* | 1/2016 | Vanderstegen-Drake | ................... A47L 11/4061 280/6.157 |
| 2016/0353959 | A1* | 12/2016 | Lindhé | .................... A47L 11/24 |
| 2017/0238778 | A1* | 8/2017 | Kim | ...................... B62D 61/12 |
| 2018/0235421 | A1 | 8/2018 | Tsuboi et al. | |
| 2019/0104908 | A1* | 4/2019 | He | ......................... G05D 1/02 |
| 2019/0133402 | A1* | 5/2019 | Xie | ........................ A47L 9/2852 |
| 2019/0187717 | A1* | 6/2019 | He | ........................ A47L 9/2826 |
| 2020/0235697 | A1* | 7/2020 | Zhu | ........................ H02S 40/10 |
| 2021/0290024 | A1* | 9/2021 | Xie | ........................ G05D 1/0263 |
| 2021/0321853 | A1* | 10/2021 | He | ...................... A47L 11/4041 |
| 2022/0022371 | A1* | 1/2022 | Askenmalm | .......... G01S 13/881 |
| 2022/0026920 | A1* | 1/2022 | Ebrahimi Afrouzi | ........................ B25J 9/1664 |
| 2022/0066456 | A1* | 3/2022 | Ebrahimi Afrouzi | ..... A47L 9/30 |

FOREIGN PATENT DOCUMENTS

| | | |
|---|---|---|
| CN | 107456172 A | 12/2017 |
| CN | 107456173 A | 12/2017 |
| CN | 108351646 A | 7/2018 |
| CN | 108836195 A | 11/2018 |
| CN | 108856019 | 11/2018 |
| CN | 109227568 A | 1/2019 |
| WO | 2015198651 | 12/2016 |

OTHER PUBLICATIONS

First Office Action dated Mar. 30, 2021, for Indian Application No. 202044002943.

* cited by examiner

PHOTOVOLTAIC-MODULE CLEANING ROBOT AND OBSTACLE-SURMOUNTING CONTROL METHOD AND DEVICE THEREOF

CROSS REFERENCE TO RELATED APPLICATIONS

The present application claims the priority to Chinese Patent Application No. 201910062807.0, titled "PHOTOVOLTAIC-MODULE CLEANING ROBOT AND OBSTACLE-SURMOUNTING CONTROL METHOD AND DEVICE THEREOF", filed with the China National Intellectual Property Administration on Jan. 23, 2019, which is incorporated herein by reference in its entirety.

FIELD

The present application relates to the technical field of photovoltaic-module cleaning robot control, and in particular to a photovoltaic-module cleaning robot and an obstacle-surmounting control method and device thereof.

BACKGROUND

The capability of a photovoltaic-module cleaning robot to surmount a vertical drop height obstacle between adjacent modules is a key product index of the photovoltaic-module cleaning robot. The stronger the capability, the higher the adaptability of the photovoltaic-module cleaning robot, which can save a lot of engineering transformation costs.

However, as for most of the photovoltaic-module cleaning robots in the conventional technology, all driving wheels of the device used for rolling are connected together through a connecting rod mechanism, and are driven to move by one motor, thereby forming a fully synchronous rolling system. Such a design guarantees, to a certain extent, that the device can operate in a stable posture under good working conditions. However, once the robot runs into the vertical drop height between adjacent modules, such a synchronous structure will cause a situation that the front driving wheel passes through the drop height and the rear driving wheel gets stuck at the drop height.

Therefore, in the conventional technology, the above situation is generally improved by means of increasing the power of the device, increasing a radius of the driving wheel and the like. However, the limitations of the above means are very obvious, the effect is not prominent, and the device still gets stuck frequently.

SUMMARY

A photovoltaic-module cleaning robot and an obstacle-surmounting control method and device thereof are provided according to the present application, so as to solve the problem of easily getting stuck at a drop height between adjacent modules.

The technical solutions of the present application are described below to realize the above object.

An obstacle-surmounting control method of a photovoltaic-module cleaning robot is applied to an obstacle-surmounting control device of the photovoltaic-module cleaning robot. The photovoltaic-module cleaning robot includes an upper end motor and a lower end motor. The obstacle-surmounting control method of the photovoltaic-module cleaning robot includes: determining whether the photovoltaic-module cleaning robot gets stuck during obstacle-surmounting; controlling the lower end motor of the photovoltaic-module cleaning robot to operate reversely, and the upper end motor to stop, if the photovoltaic-module cleaning robot gets stuck during obstacle-surmounting; determining whether the photovoltaic-module cleaning robot meets a forward moving condition; and controlling the upper end motor and the lower end motor of the photovoltaic-module cleaning robot to simultaneously operate forward, if the photovoltaic-module cleaning robot meets the forward moving condition.

Preferably, N1 range sensors are arranged on a top left side of the photovoltaic-module cleaning robot, and N2 range sensors are arranged on a top right side of the photovoltaic-module cleaning robot. The range sensors are equidistant from a center line of the photovoltaic-module cleaning robot, and are configured to detect a distance between the sensor itself and a top of a photovoltaic module. Both N1 and N2 are positive integers.

In the obstacle-surmounting control method of the photovoltaic-module cleaning robot, the determining whether the photovoltaic-module cleaning robot gets stuck during obstacle-surmounting includes: determining whether one of two distance averages is less than an initial value; where the two distance averages respectively are an average of distances detected by the N1 range sensors, and an average of distances detected by the N2 range sensors.

It is determined that the photovoltaic-module cleaning robot gets stuck during obstacle-surmounting, if one of the two distance averages is less than the initial value.

Preferably, the determining whether one of the two distance averages is less than the initial value includes: determining whether an average value of the distances detected by the range sensors located on a rear side is less than the initial value when the motors are rotating forward.

Preferably, the forward moving condition is that a difference between the two distance averages is less than a predetermined threshold.

Preferably, the range sensor may be any one of an ultrasonic sensor, an infrared sensor and a radar sensor.

The obstacle-surmounting control device of a photovoltaic-module cleaning robot is provided according to the present application. The photovoltaic-module cleaning robot includes an upper end motor and a lower end motor. The obstacle-surmounting control device of the photovoltaic-module cleaning robot includes: a first determining unit, configured to determine whether the photovoltaic-module cleaning robot gets stuck during obstacle-surmounting; a control unit, configured to control the lower end motor of the photovoltaic-module cleaning robot to operate reversely, and the upper end motor to stop, if the first determining unit determines that the photovoltaic-module cleaning robot gets stuck during obstacle-surmounting; and a second determining unit, configured to determine whether the photovoltaic-module cleaning robot meets a forward moving condition.

The control unit is further configured to control the upper end motor and the lower end motor of the photovoltaic-module cleaning robot to simultaneously operate forward, if the second determining unit determines that the photovoltaic-module cleaning robot meets the forward moving condition.

Preferably, N1 range sensors are arranged on a top left side of the photovoltaic-module cleaning robot, and N2 range sensors are arranged on a top right side of the photovoltaic-module cleaning robot. The range sensors are equidistant from a center line of the photovoltaic-module cleaning robot, and are configured to detect a distance between the sensor itself and a top of a photovoltaic module. N1 and N2 are positive integers.

The first determining unit, configured to determine whether the photovoltaic-module cleaning robot gets stuck during obstacle-surmounting, is specifically applied to: determining whether one of two distance averages is less than an initial value; where the two distance averages respectively are an average of distances detected by the N1 range sensors, and an average of distances detected by the N2 range sensors.

It is determined that the photovoltaic-module cleaning robot gets stuck during obstacle-surmounting, if one of the two distance averages is less than the initial value.

Preferably, the determining whether one of the two distance averages is less than the initial value by the first determining unit specifically includes: determining whether an average value of the distances detected by the range sensors located on a rear side is less than the initial value when the motors are rotating forward.

Preferably, the forward moving condition is that a difference between the two distance averages is less than a predetermined threshold.

Preferably, the range sensor may be any one of an ultrasonic sensor, an infrared sensor and a radar sensor.

A photovoltaic-module cleaning robot includes: a cleaning device, an upper end motor, a lower end motor, two upper driving wheels, two lower driving wheels, N1 range sensors arranged on a top left side of the photovoltaic-module cleaning robot, N2 range sensors arranged on a top right side of the photovoltaic-module cleaning robot, and an obstacle-surmounting control device of the photovoltaic-module cleaning robot according to any one of the above aspects. N1 and N2 are positive integers.

The upper end motor is configured to drive the two upper driving wheels to rotate.

The lower end motor is configured to drive the two lower driving wheels to rotate.

The cleaning device is configured to clean dust on a surface of the photovoltaic module.

Preferably, all the range sensors are arranged at a top inside position between the two upper driving wheels of the photovoltaic-module cleaning robot.

According to the obstacle-surmounting method of the photovoltaic-module cleaning robot provided by the present application, if the photovoltaic-module cleaning robot gets stuck during obstacle-surmounting, the lower end motor of the photovoltaic-module cleaning robot is controlled to operate reversely, so that the lower driving wheels of the photovoltaic-module cleaning robot rotate reversely; the upper end motor of the photovoltaic-module cleaning robot is controlled to stop operating, so that the upper driving wheels of the photovoltaic-module cleaning robot have no drive; and then, the photovoltaic-module cleaning robot is gradually restored to a horizontal state, and if it is determined that the photovoltaic-module cleaning robot meets the forward moving condition, the upper end motor and the lower end motor of the photovoltaic-module cleaning robot are controlled to simultaneously rotate forward to realize moving forward, thereby solving the problem of easily getting stuck at a drop height between adjacent modules.

BRIEF DESCRIPTION OF THE DRAWINGS

In order to more clearly illustrate embodiments of the present application or technical solutions, the drawings, which are to be used in the description of the embodiments, are briefly described. It is apparent that, the drawings in the following description show only some embodiments of the present application, and other drawings may be obtained by those skilled in the art from the drawings without creative efforts.

DETAILED DESCRIPTION OF THE EMBODIMENTS

Technical solutions in embodiments of the present application are described clearly and completely hereinafter in conjunction with the drawings of the embodiments of the present application. Apparently, the embodiments described herein are only a few rather than all of the embodiments of the present application. Any other embodiments obtained by those skilled in the art based on the embodiments in the present application without any creative efforts fall within the protection scope of the present application.

An obstacle-surmounting control method of a photovoltaic-module cleaning robot is provided according to the present application, so as to solve the problem of easily getting stuck at a drop height between adjacent modules.

Figure 1:
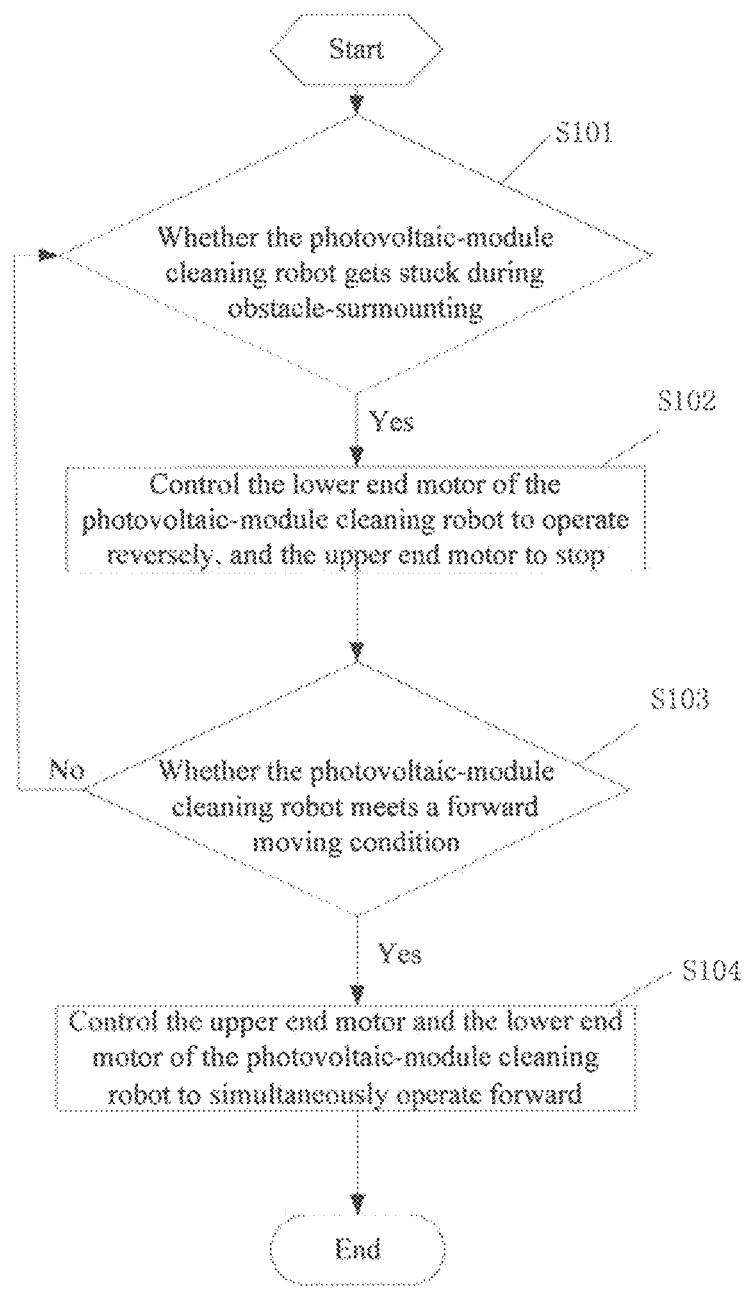
FIG. 1 is a flow chart of an obstacle-surmounting control method of a photovoltaic-module cleaning robot according to an embodiment of the present application.

The obstacle-surmounting control method of the photovoltaic-module cleaning robot is applied to an obstacle-surmounting control device of the photovoltaic-module cleaning robot. The photovoltaic-module cleaning robot includes an upper end motor and a lower end motor. Referring to FIG. 1, the obstacle-surmounting control method of the photovoltaic-module cleaning robot includes steps S101 to S104:

Step S101, determining whether the photovoltaic-module cleaning robot gets stuck during obstacle-surmounting;

A travelling direction of the photovoltaic-module cleaning robot may be toward left or toward right. No matter which direction the photovoltaic-module cleaning robot moves toward, the robot may run into a vertical drop height between adjacent modules, which may cause a situation that a front driving wheel passes through the drop height and a rear driving wheel gets stuck at the drop height. The obstacle-surmounting control device determines whether the photovoltaic-module cleaning robot gets stuck during obstacle-surmounting based on corresponding real-time detection signals, such as whether the motor is stalled and whether the front driving wheel runs idly. If the photovoltaic-module cleaning robot gets stuck during obstacle-surmounting, step S102 is performed.

Step S102, controlling the lower end motor of the photovoltaic-module cleaning robot to operate reversely, and the upper end motor to stop;

The travelling direction of the photovoltaic-module cleaning robot may be toward left or toward right. No matter toward which direction, an operation direction of the motor corresponding to the current travelling direction is defined as a forward rotation direction of the motors. For example, in a case that the photovoltaic-module cleaning robot travels to the right, a forward rotation state of the motors of the robot corresponds to a state that the driving wheels roll to the right and the photovoltaic-module cleaning robot moves forward, while a reverse rotation state of the motors of the robot corresponds to a state that the driving wheels roll to the left and the photovoltaic-module cleaning robot moves in reverse. In a case that the photovoltaic-module cleaning robot travels to the left, the forward rotation state of the motors of the robot corresponds to a state that the driving wheels roll to the left and the photovoltaic-module cleaning robot moves forward, while the reverse rotation state of the motors of the robot corresponds to a state that the driving wheels roll to the right and the photovoltaic-module cleaning robot moves in reverse.

Figure 2A:
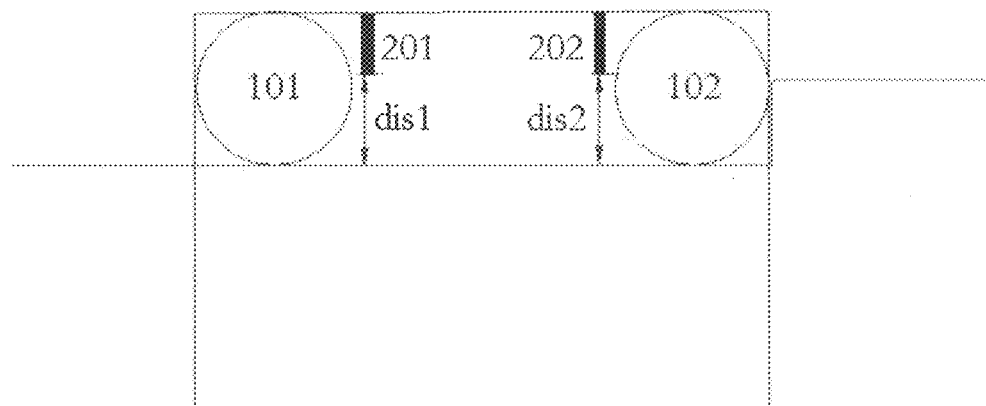
FIGS. 2a to 2c are schematic diagrams showing states of the photovoltaic-module cleaning robot according to an embodiment of the present application when a travelling direction of the photovoltaic-module cleaning robot is from left to right.
Figure 2B:
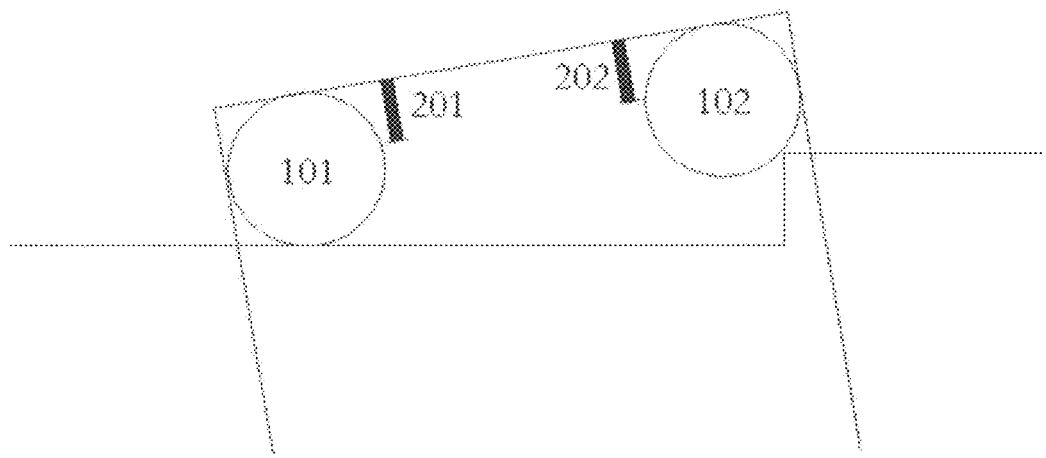
Figure 2C:
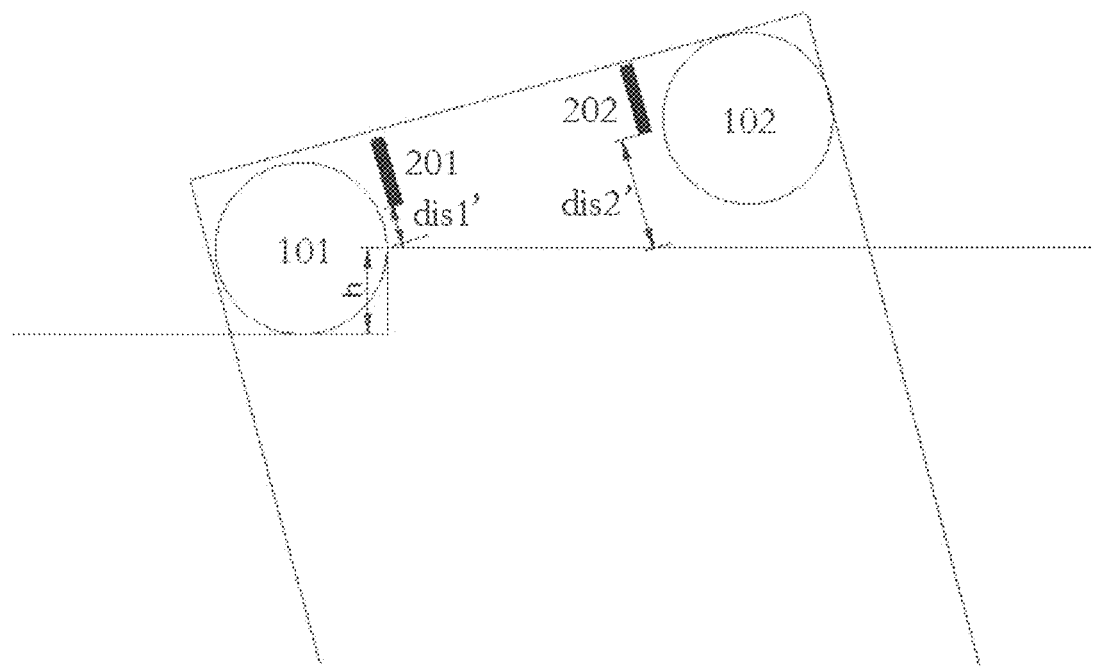
Figure 3A:
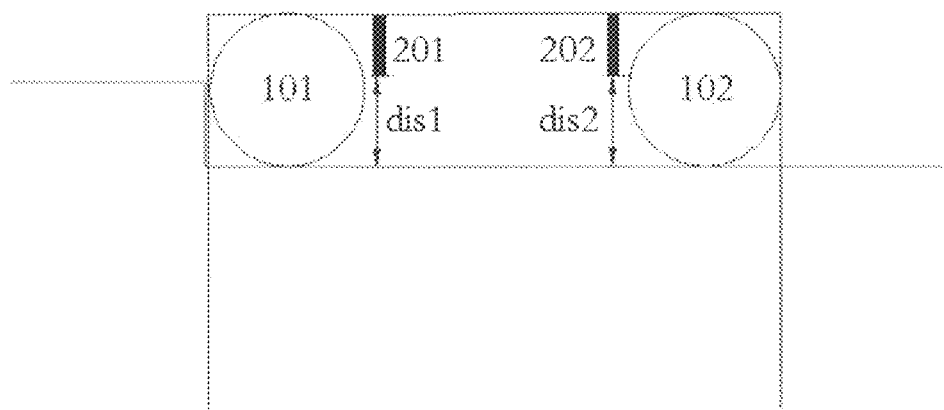
FIGS. 3a to 3b are schematic diagrams showing states of the photovoltaic-module cleaning robot according to an embodiment of the present application when the travelling direction of the photovoltaic-module cleaning robot is from right to left.
Figure 3B:
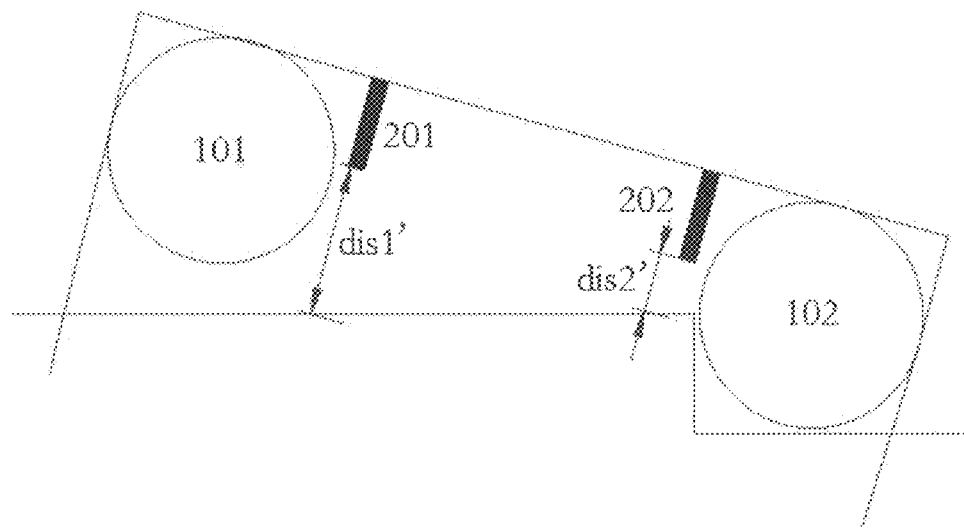

FIGS. 2a to 2c are schematic diagrams showing a situation in which the photovoltaic-module cleaning robot travels to the right and runs into the vertical drop height between adjacent modules, where FIG. 2a shows a state before obstacle-surmounting, and FIG. 2b shows a state during the obstacle-surmounting; the photovoltaic-module cleaning robot is gradually inclined, the front upper driving wheel (right upper driving wheel 102) is lifted up and gradually surmounts the obstacle, and then the rear upper driving wheel (left upper driving wheel 101) gets stuck at the end surface obstacle, turning into a state shown in FIG. 2c. Similarly, FIGS. 3a to 3b are schematic diagrams showing a situation in which the photovoltaic-module cleaning robot travels to the left and runs into the vertical drop height between adjacent modules.

Figure 4A:
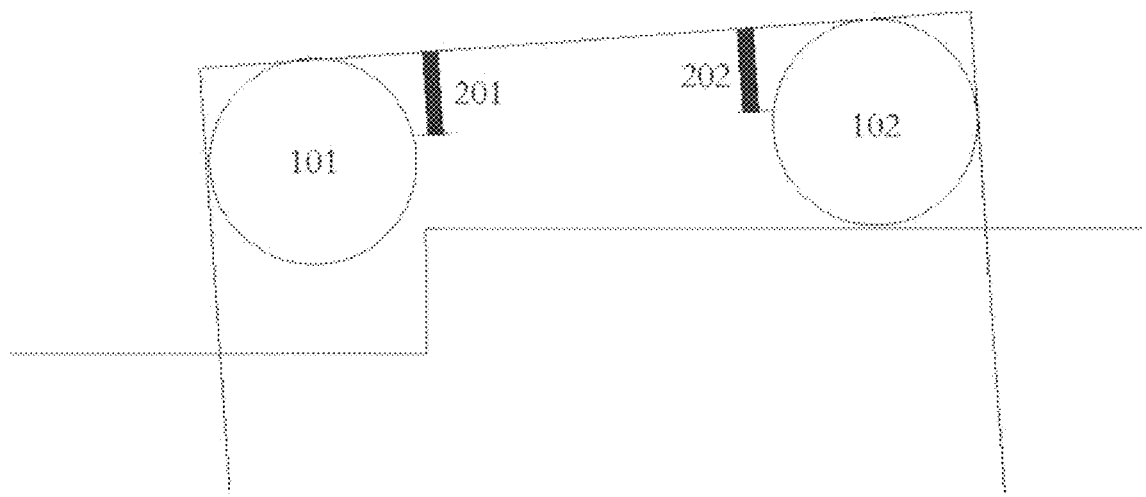
FIGS. 4a to 4b are schematic diagrams showing a reverse state of the photovoltaic-module cleaning robot according to an embodiment of the present application when the travelling direction of the photovoltaic-module cleaning robot is from left to right and the photovoltaic-module cleaning robot gets stuck during obstacle-surmounting.
Figure 4B:
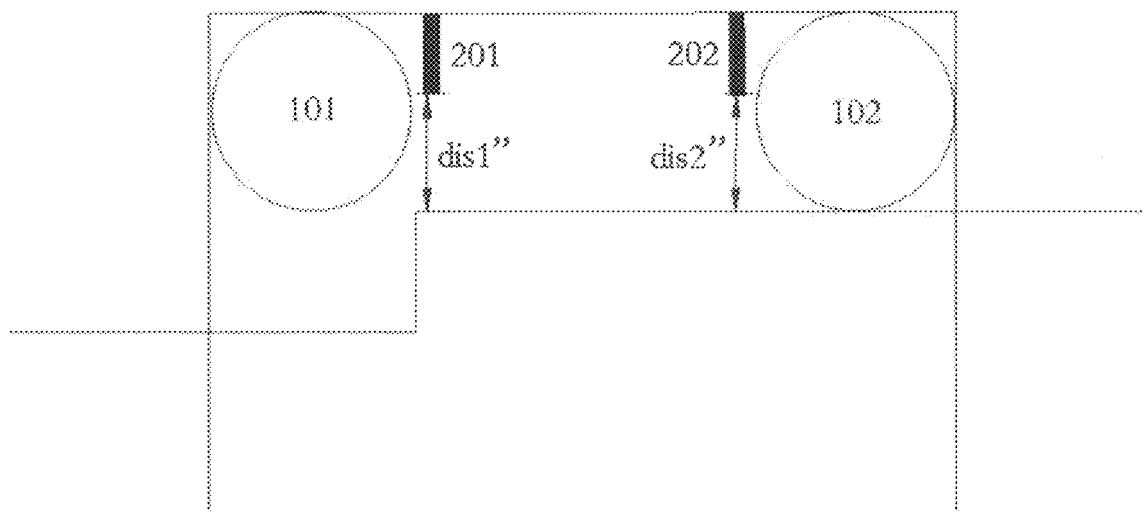

Taking the robot travelling to the right as an example, according to step S102, the lower end motor is controlled to operate reversely, and the upper end motor is controlled to stop operating, so that the left lower driving wheel of the photovoltaic-module cleaning robot rotates to the left, realizing reversing, and then, the photovoltaic-module cleaning robot is gradually restored to a horizontal state as shown in FIG. 4a, and the photovoltaic-module cleaning robot is at last restored to an almost horizontal state as shown in FIG. 4b. The situation of travelling to the left is similar, and will not be described in detail.

Step S103, determining whether the photovoltaic-module cleaning robot meets a forward moving condition;

In the case that the photovoltaic-module cleaning robot is gradually restored to the horizontal state by reversing, the obstacle-surmounting control device determines whether the forward moving condition is met based on corresponding real-time detection signals, such as the horizontally or verticality of the photovoltaic module cleaning robot. If the photovoltaic-module cleaning robot meets the forward moving condition, step S104 is performed.

Step S104, controlling the upper end motor and the lower end motor of the photovoltaic-module cleaning robot to simultaneously operate forward.

At this time, all the driving wheels of the photovoltaic-module cleaning robot will continue to roll in an original direction, so that the photovoltaic-module cleaning robot can continuously move forward.

According to the obstacle-surmounting method of the photovoltaic-module cleaning robot provided by the present embodiment, if the photovoltaic-module cleaning robot gets stuck during obstacle-surmounting, the lower end motor of the photovoltaic-module cleaning robot is controlled to operate reversely, so that the lower driving wheel of the photovoltaic-module cleaning robot rotates reversely; the upper end motor of the photovoltaic-module cleaning robot is controlled to stop operating, so that the upper driving wheel of the photovoltaic-module cleaning robot has no drive; and then, the photovoltaic-module cleaning robot is gradually restored to a horizontal state, and if it is determined that the photovoltaic-module cleaning robot meets the forward moving condition, the upper end motor and the lower end motor of the photovoltaic-module cleaning robot are controlled to simultaneously rotate forward to realize moving forward, thereby solving the problem of easily getting stuck at a drop height between adjacent modules.

Another specific obstacle-surmounting control method of the photovoltaic-module cleaning robot is further provided according to another embodiment of the present application. On the basis of the previous embodiment, in order to implement the determining processes in steps S101 and S103 at a lower cost, in the present embodiment, N1 range sensors are arranged on a top left side of the photovoltaic-module cleaning robot, and N2 range sensors are arranged on a top right side of the photovoltaic-module cleaning robot, which are respectively configured to detect a distance between the sensor itself and a top of a photovoltaic module. Both N1 and N2 are positive integers. In practical applications, in order to better receive radiation, the photovoltaic module is generally inclined relative to a horizontal plane, and, generally, an upper end of the photovoltaic module away from the horizontal plane is referred to as the top of the photovoltaic module. Correspondingly, a top of the photovoltaic-module cleaning robot refers to an upper end of the photovoltaic module cleaning robot away from the horizontal plane. Moreover, in order to better reflect the correspondence between a posture of the photovoltaic-module cleaning robot and the detected distance, the range sensors in the present embodiment are equidistant from a center line of the photovoltaic-module cleaning robot. In practical applications, in order to save the detection cost, preferably, N1=N2=1, which is taken as an example to illustrate in FIGS. 2a to 5, and two range sensors arranged symmetrically are represented by reference numerals 201 and 202.

In practical applications, the range sensor may be any one of an ultrasonic sensor, an infrared sensor and a radar sensor, so long as the sensor can detect a distance between the sensor itself and a metal frame of the photovoltaic module, which depends on the specific application occasions and falls in the protection scope of the present application.

In the present embodiment, the step S101 of determining whether the photovoltaic-module cleaning robot gets stuck during obstacle-surmounting includes: determining whether one of two distance averages is less than an initial value; where the two distance averages respectively are an average of distances detected by the N1 range sensors, and an average of distances detected by the N2 range sensors.

It is determined that the photovoltaic-module cleaning robot gets stuck during obstacle-surmounting, if one of the two distance averages is less than the initial value.

The step of determining whether one of the two distance averages is less than the initial value specifically includes determining whether an average value of the distances detected by the range sensors located on a rear side is less than the initial value when the motors are rotating forward.

Furthermore, the forward moving condition in step S103 is that, a difference between the two distance averages is less than a predetermined threshold.

Figure 5:
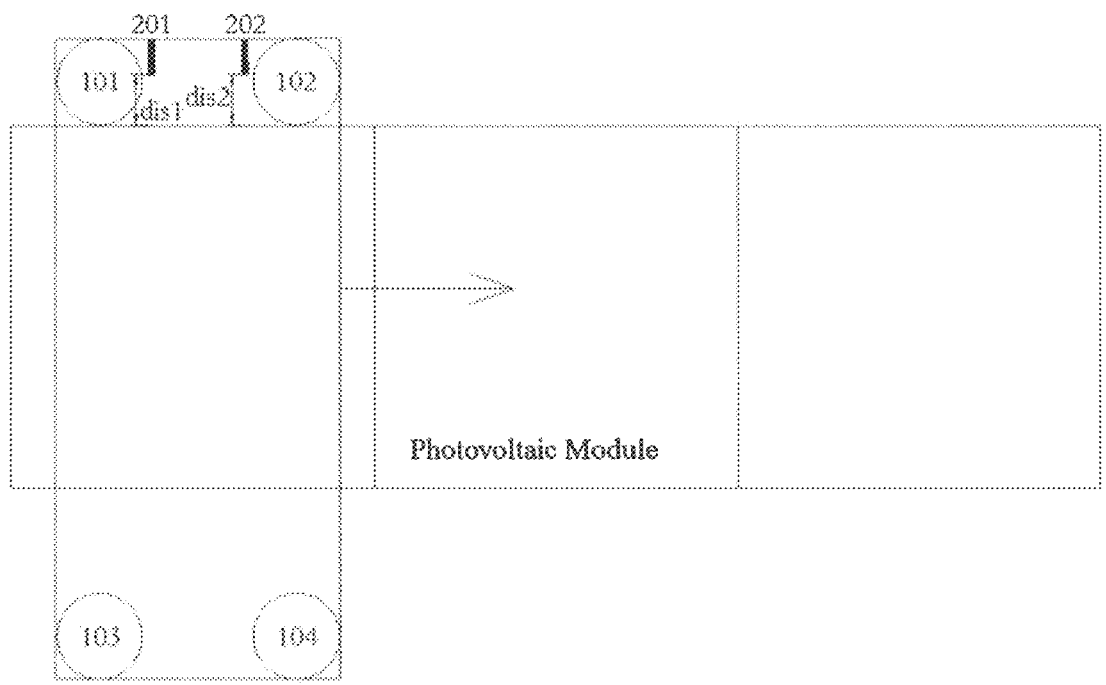
FIG. 5 is a schematic structural diagram of the photovoltaic-module cleaning robot according to an embodiment of the present application when the travelling direction of the photovoltaic-module cleaning robot is from left to right.

As shown in FIG. 5, 101 represents a left upper driving wheel, 102 represents a right upper driving wheel, 103 represents a left lower driving wheel, and 104 represents a right lower driving wheel. A case in which the photovoltaic-module cleaning robot travels from left to right is taken as an example to illustrate.

In a case that the photovoltaic-module cleaning robot runs into the end surface obstacle, the operation states of the robot are as shown in FIGS. 2a to 2c. Initial values of the distances between a pair of range sensors 201 and 202 of the device (that is, the photovoltaic-module cleaning robot) and an aluminum frame of the photovoltaic module respectively are dis1 and dis2 (as shown in FIGS. 5 and 2a). When the device runs into the end surface obstacle, the device starts to slowly incline as shown in FIG. 2b. When the device is inclined, the front upper driving wheel (right upper driving wheel 102) is lifted up and surmounts the obstacle, and then the rear upper driving wheel (left upper driving wheel 101) gets stuck at the end surface obstacle after the front upper driving wheel completely surmounts the obstacle, as show in FIG. 2c. At this time, the two distances collected by the range sensors respectively are dis1' and dis2'.

During normal travelling of the device, the distances detected by the two range sensors always meets dis1'≥dis1. Only at the end surface obstacle, the distance detected by the range sensor located on the rear side will be less than the initial value dis1, as shown in FIG. 2c, that is, dis1'<dis1 (dis1≈dis1'+h, where h indicates a height of the end surface obstacle). Therefore, it is determined that, the device gets stuck at the end surface drop height during obstacle-surmounting, if the measured distance is less than the initial value.

As shown in FIG. 2c, when the front upper driving wheel of the device (right upper driving wheel 102) surmounts the obstacle and the rear upper driving wheel (left upper driving wheel 101) gets stuck at the obstacle, the device is in an inclined state at this time. In the inclined state, the rear upper driving wheel of the device (left upper driving wheel 101) cannot surmount the obstacle and remains stuck forever. Experiments show that, if it is detected that the device is in the state shown in FIG. 2c, the obstacle can be surmounted by adjusting the state of the device through a control strategy. Specifically, if it is detected that the device gets stuck during obstacle-surmounting, the lower end motor of the device is controlled to operate reversely to realize reversing, and the upper end motor is controlled to stop, and then the device is gradually restored to the horizontal state as shown in FIG. 4a. When the device reaches to a position shown in FIG. 4b, the upper and lower end motors of the device are controlled to simultaneously rotate forward, and then the device can successfully surmount the obstacle.

In order to allow the device to reach the position as shown in FIG. 4b by reversely rotating the lower end motor, with not too little or too much reversing, distances dis2" and dis1", between the range sensors and the top of the photovoltaic module, are respectively detected by the two range sensors 201 and 202. When dis2"−dis1"=0, the lower end motor is controlled to stop reversely rotating. In practical applications, due to system errors, if dis2"−dis1"<m, it can be considered that the device is almost in the horizontal state, and then the lower end motor is controlled to stop reversely rotating, and then the upper and lower end motors of the device are controlled to simultaneously rotate forward. m indicates a predetermined threshold for reversing stop.

Similarly, in the case that the device travels from right to left, if the device runs into the end surface obstacle, the operation states of the device are as shown in FIGS. 3a and 3b. Initial values of the distances between the two range sensors 201 and 202 of the device and the aluminum frame of the photovoltaic module respectively are dis1 and dis2. When the device runs into the end surface obstacle, the device starts to slowly incline, the front upper driving wheel (left upper driving wheel 101) is lifted up and surmounts the obstacle, and then the rear upper driving wheel (right upper driving wheel 102) gets stuck at the end surface obstacle, as show in FIG. 3b. The two distances collected by the range sensors respectively are dis1' and dis2', and dis2'<dis2 (dis2≈dis2'+h, where h indicates the height of the end surface obstacle). At this time, it is determined that the device gets stuck during obstacle-surmounting. Then, the lower end motor of the device is controlled to operate reversely to realize reversing, and the upper end motor is controlled to stop, and then the device is gradually restored to the horizontal state. When distances, dis2" and dis1", between the range sensors and the top of the photovoltaic module respectively detected by the two range sensors 201 and 202 satisfy dis1"−dis2"<m, the lower end motor is controlled to stop reversely rotating, and the upper and lower end motors are controlled to simultaneously rotate forward. m indicates the predetermined threshold for reversing stop.

The present embodiment provides a specific obstacle-surmounting control strategy, which determines the characteristics of the end surface obstacle by detecting distances. According to the control strategy, when the device gets stuck, the lower end of the device moves in reverse and the overall device is restored to horizon by means of reversely rotating the lower end motor; and the reverse rotation of the lower end motor is restrained according to comparison between the two distance averages close to the front and rear driving wheels, and finally, the upper and lower end motors are controlled to simultaneously rotate forward, so that the photovoltaic-module cleaning robot successfully surmounts the end surface obstacle, which has low implementation cost and simple logic.

Figure 6:
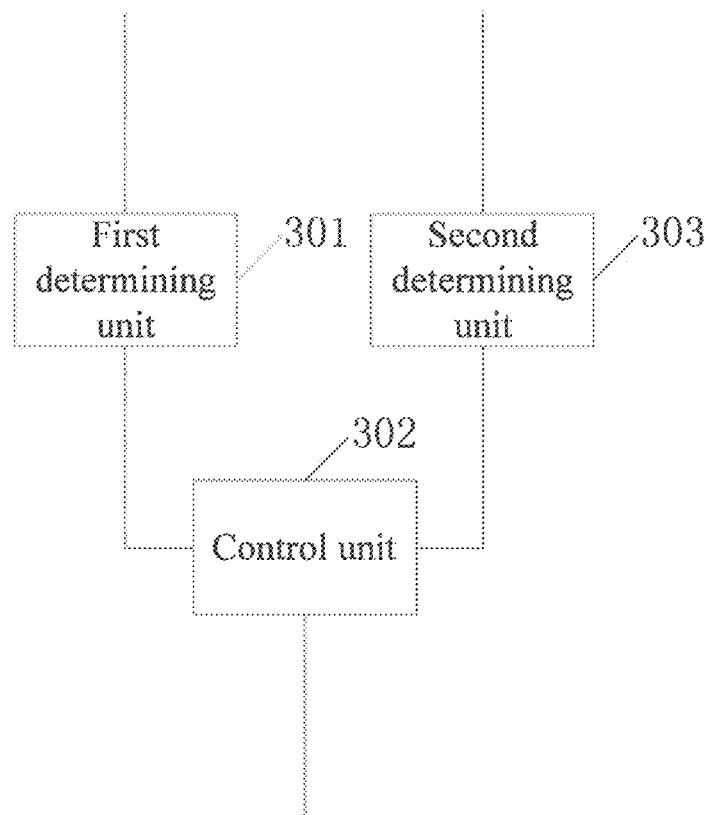
FIG. 6 is a schematic structural diagram of an obstacle-surmounting control device of the photovoltaic-module cleaning robot according to an embodiment of the present application.

An obstacle-surmounting control device of the photovoltaic-module cleaning robot is provided according to another embodiment of the present application, as shown in FIG. 6, which includes: a first determining unit 301, configured to determine whether the photovoltaic-module cleaning robot gets stuck during obstacle-surmounting; a control unit 302, configured to control the lower end motor of the photovoltaic-module cleaning robot to operate reversely, and the upper end motor to stop, if the first determining unit 301 determines that the photovoltaic-module cleaning robot gets stuck during obstacle-surmounting; and a second determining unit 303, configured to determine whether the photovoltaic-module cleaning robot meets a forward moving condition.

The control unit 302 is further configured to control the upper end motor and the lower end motor of the photovoltaic-module cleaning robot to simultaneously operate forward, if the second determining unit 303 determines that the photovoltaic-module cleaning robot meets the forward moving condition.

Preferably, N1 range sensors are arranged on a top left side of the photovoltaic-module cleaning robot, and N2 range sensors are arranged on a top right side of the photovoltaic-module cleaning robot. The range sensors are equidistant from the center line of the photovoltaic-module cleaning robot, and are configured to detect a distance between the sensor itself and the top of the photovoltaic module. Both N1 and N2 are positive integers, N1=N2=1 is taken as an example to illustrate in FIG. 5, and two range sensors are represented by reference numerals 201 and 202.

The first determining unit 301, configured to determine whether the photovoltaic-module cleaning robot gets stuck during obstacle-surmounting, is specifically applied to: determining whether one of two distance averages is less than an initial value; where the two distance averages respectively are an average of distances detected by the N1 range sensors, and an average of distances detected by the N2 range sensors.

It is determined that the photovoltaic-module cleaning robot gets stuck during obstacle-surmounting, if one of the two distance averages is less than the initial value.

Preferably, the determining whether one of the two distance averages is less than the initial value by the first determining unit 301 specifically includes: determining whether an average value of the distances detected by the range sensors located on a rear side is less than the initial value when the motors are rotating forward.

Preferably, the forward moving condition is that a difference between the two distance averages is less than a predetermined threshold.

In practical applications, the range sensor may be any one of an ultrasonic sensor, an infrared sensor and a radar sensor, so long as the sensor can detect a distance between the sensor itself and a metal frame of the photovoltaic module, which depends on the specific application occasions and falls in the protection scope of the present application.

The principle is the same as the above embodiments, and will not be described in detail.

A photovoltaic-module cleaning robot is provided according to another embodiment of the present application, as shown in FIG. 5, which includes: a cleaning device (not shown), an upper end motor (not shown), a lower end motor (not shown), two upper driving wheels (left upper driving wheel 101 and right upper driving wheel 102), two lower driving wheels (left lower driving wheel 103 and right lower driving wheel 104), N1 range sensors arranged on a top left side of the photovoltaic-module cleaning robot, N2 range sensors arranged on a top right side of the photovoltaic-module cleaning robot, and an obstacle-surmounting control device of the photovoltaic-module cleaning robot according to any one of the above embodiments. N1 and N2 are positive integers.

The upper end motor is configured to drive the two upper driving wheels to rotate.

The lower end motor is configured to drive the two lower driving wheels to rotate.

The cleaning device is configured to clean dust on a surface of the photovoltaic module.

Preferably, all the range sensors are equidistant from the centerline of the photovoltaic-module cleaning robot, and all the range sensors are arranged at a top inside position between the two upper driving wheels of the photovoltaic-module cleaning robot, which can well protect the range sensors from being damaged by collision with the outside aluminum frame of the photovoltaic module.

In practical applications, the range sensor may be any one of an ultrasonic sensor, an infrared sensor and a radar sensor, so long as the sensor can detect a distance between the sensor itself and a metal frame of the photovoltaic module, which depends on the specific application occasions and falls in the protection scope of the present application.

The operation principle of the obstacle-surmounting device is the same as those in the above embodiments, and will not be described in detail herein again.

The embodiments of the present application are described in a progressive manner, and each embodiment is focused on describing difference from other embodiments, and the same or similar parts among the embodiments may refer to each other. For the device disclosed in the embodiments, the corresponding descriptions are relatively simple because the device corresponds to the methods disclosed in the embodiments. For the relevant portions, one may be refer to the description of the method parts.

The above-described is merely preferred embodiments of the present application and is not intended to define the present application in any form. Preferred embodiments of the present application are disclosed above, which should not be construed as limiting the present application. Numerous alternations, modifications, and equivalents can be made to the technical solution of the present application by those skilled in the art according to the methods and technical content disclosed herein without deviation from the scope of the technical solution of the present application. Therefore, any alternations, equivalents and modifications made to the embodiments above according to the technical essence of the present application without deviation from the content of the technical solution of the present application should fall in the protection scope of the present application.

The invention claimed is:

1. An obstacle-surmounting control method of a photovoltaic-module cleaning robot, wherein the control method is applied to an obstacle-surmounting control device of the photovoltaic-module cleaning robot, and the photovoltaic-module cleaning robot comprises an upper end motor and a lower end motor; the obstacle-surmounting control method of the photovoltaic-module cleaning robot comprises the following steps:
   determining whether the photovoltaic-module cleaning robot gets stuck during obstacle-surmounting;
   controlling the lower end motor of the photovoltaic-module cleaning robot to operate reversely, and the upper end motor to stop, if the photovoltaic-module cleaning robot gets stuck during obstacle-surmounting;
   determining whether the photovoltaic-module cleaning robot meets a forward moving condition; and
   controlling the upper end motor and the lower end motor of the photovoltaic-module cleaning robot to simultaneously operate forward, if the photovoltaic-module cleaning robot meets the forward moving condition.

2. The obstacle-surmounting control method of the photovoltaic-module cleaning robot according to claim 1, wherein:
   N1 range sensors are arranged on a top left side of the photovoltaic-module cleaning robot;
   N2 range sensors are arranged on a top right side of the photovoltaic-module cleaning robot;
   the range sensors are equidistant from a center line of the photovoltaic-module cleaning robot;
   the range sensors are configured to detect a distance between the range sensor itself and a top of a photovoltaic module;
   N1 and N2 are positive integers; and
   in the obstacle-surmounting control method of the photovoltaic-module cleaning robot, the step of determining whether the photovoltaic-module cleaning robot gets stuck during obstacle-surmounting comprises:
  determining whether one of two distance averages is less than an initial value, wherein the two distance averages respectively are an average of distances detected by the N1 range sensors, and an average of distances detected by the N2 range sensors; and
  it is determined that the photovoltaic-module cleaning robot gets stuck during obstacle-surmounting, if one of the two distance averages is less than the initial value.

3. The obstacle-surmounting control method of the photovoltaic-module cleaning robot according to claim 2, wherein the step of determining whether one of the two distance averages is less than the initial value comprises determining whether an average value of the distances detected by the range sensors located on a rear side is less than the initial value when the motors are rotating forward.

4. The obstacle-surmounting control method of the photovoltaic-module cleaning robot according to claim 2, wherein the forward moving condition is that a difference between the two distance averages is less than a predetermined threshold.

5. The obstacle-surmounting control method of the photovoltaic-module cleaning robot according to claim 3, wherein the forward moving condition is that a difference between the two distance averages is less than a predetermined threshold.

6. The obstacle-surmounting control method of the photovoltaic-module cleaning robot according to claim 2, wherein the range sensor is any one of an ultrasonic sensor, an infrared sensor and a radar sensor.

7. The obstacle-surmounting control method of the photovoltaic-module cleaning robot according to claim 3, wherein the range sensor is any one of an ultrasonic sensor, an infrared sensor and a radar sensor.

8. An obstacle-surmounting control device of a photovoltaic-module cleaning robot, wherein the photovoltaic-module cleaning robot comprises an upper end motor and a lower end motor; and the obstacle-surmounting control device of the photovoltaic-module cleaning robot comprises:
  a first determining unit, configured to determine whether the photovoltaic-module cleaning robot gets stuck during obstacle-surmounting;
  a control unit, configured to control the lower end motor of the photovoltaic-module cleaning robot to operate reversely, and the upper end motor to stop, if the first determining unit determines that the photovoltaic-module cleaning robot gets stuck during obstacle-surmounting; and
  a second determining unit, configured to determine whether the photovoltaic-module cleaning robot meets a forward moving condition;
  wherein the control unit is further configured to control the upper end motor and the lower end motor of the photovoltaic-module cleaning robot to simultaneously operate forward, if the second determining unit determines that the photovoltaic-module cleaning robot meets the forward moving condition.

9. The obstacle-surmounting control device of the photovoltaic-module cleaning robot according to claim 8, wherein:
  N1 range sensors are arranged on a top left side of the photovoltaic-module cleaning robot;
  N2 range sensors are arranged on a top right side of the photovoltaic-module cleaning robot;
  the range sensors are equidistant from a center line of the photovoltaic-module cleaning robot;
  the range sensors are configured to detect a distance between the range sensor itself and a top of a photovoltaic module;
  N1 and N2 are positive integers; and
  the first determining unit, configured to determine whether the photovoltaic-module cleaning robot gets stuck during obstacle-surmounting, is applied to:
    determine whether one of two distance averages is less than an initial value; wherein the two distance averages respectively are an average of distances detected by the N1 range sensors, and an average of distances detected by the N2 range sensors; and
    it is determined that the photovoltaic-module cleaning robot gets stuck during obstacle-surmounting, if one of the two distance averages is less than the initial value.

10. The obstacle-surmounting control device of the photovoltaic-module cleaning robot according to claim 9, wherein the step of determining whether one of the two distance averages is less than the initial value by the first determining unit comprises:
  determining whether an average value of the distances detected by the range sensors located on a rear side is less than the initial value when the motors are rotating forward.

11. The obstacle-surmounting control device of the photovoltaic-module cleaning robot according to claim 9, wherein the forward moving condition is that a difference between the two distance averages is less than a predetermined threshold.

12. The obstacle-surmounting control device of the photovoltaic-module cleaning robot according to claim 10, wherein the forward moving condition is that a difference between the two distance averages is less than a predetermined threshold.

13. The obstacle-surmounting control device of the photovoltaic-module cleaning robot according to claim 9, wherein the range sensor is any one of an ultrasonic sensor, an infrared sensor and a radar sensor.

14. The obstacle-surmounting control device of the photovoltaic-module cleaning robot according to claim 10, wherein the range sensor is any one of an ultrasonic sensor, an infrared sensor and a radar sensor.

15. A photovoltaic-module cleaning robot, comprising:
  a cleaning device;
  an upper end motor;
  a lower end motor;
  two upper driving wheels;
  two lower driving wheels;
  N1 range sensors arranged on a top left side of the photovoltaic-module cleaning robot;
  N2 range sensors arranged on a top right side of the photovoltaic-module cleaning robot; and
  the obstacle-surmounting control device of the photovoltaic-module cleaning robot according to claim 8;
  wherein N1 and N2 are positive integers;
  wherein the upper end motor is configured to drive the two upper driving wheels to rotate;
  wherein the lower end motor is configured to drive the two lower driving wheels to rotate; and
  wherein the cleaning device is configured to clean dust on a surface of a photovoltaic module.

16. A photovoltaic-module cleaning robot, comprising:
  a cleaning device;
  an upper end motor;

a lower end motor;
two upper driving wheels;
two lower driving wheels;
N1 range sensors arranged on a top left side of the photovoltaic-module cleaning robot;
N2 range sensors arranged on a top right side of the photovoltaic-module cleaning robot; and
the obstacle-surmounting control device of the photovoltaic-module cleaning robot according to claims 9; N1 and N2 are positive integers;
wherein the upper end motor is configured to drive the two upper driving wheels to rotate;
wherein the lower end motor is configured to drive the two lower driving wheels to rotate; and
wherein the cleaning device is configured to clean dust on a surface of a photovoltaic module.

17. A photovoltaic-module cleaning robot, comprising:
a cleaning device;
an upper end motor;
a lower end motor;
two upper driving wheels;
two lower driving wheels;
N1 range sensors arranged on a top left side of the photovoltaic-module cleaning robot;
N2 range sensors arranged on a top right side of the photovoltaic-module cleaning robot; and
the obstacle-surmounting control device of the photovoltaic-module cleaning robot according to claim 10;
wherein N1 and N2 are positive integers;
wherein the upper end motor is configured to drive the two upper driving wheels to rotate;
wherein the lower end motor is configured to drive the two lower driving wheels to rotate; and
wherein the cleaning device is configured to clean dust on a surface of a photovoltaic module.

18. The photovoltaic-module cleaning robot according to claim 15, wherein the range sensors are arranged at a top inside position between the two upper driving wheels of the photovoltaic-module cleaning robot.

* * * * *